United States Patent [19]

Ellis

[11] Patent Number: 4,652,747
[45] Date of Patent: Mar. 24, 1987

[54] SHAFT ENCODER HAVING A CONCAVE REFLECTIVE ELEMENT WITH TWO REGIONS OF DIFFERENT REFLECTIVITY FOR LIGHT WITHIN TWO DIFFERENT WAVELENGTH BANDS

[75] Inventor: Stafford M. Ellis, Sussex, England
[73] Assignee: GEC Avionics Limited, England
[21] Appl. No.: 654,640
[22] Filed: Sep. 25, 1984
[30] Foreign Application Priority Data Sep. 28, 1983 [GB] United Kingdom ............... 8325921

[51] Int. Cl.⁴ .............................................. G01D 5/34
[52] U.S. Cl. ............................... 250/231 SE; 250/226
[58] Field of Search ............. 250/231 SE, 237 G, 226, 250/227; 455/605, 610, 612

[56] References Cited

U.S. PATENT DOCUMENTS

| | | | |
|---|---|---|---|
| 3,399,347 | 8/1968 | Martens | 250/231 SE |
| 3,455,637 | 7/1969 | Howard | 250/227 |
| 3,983,391 | 9/1976 | Clemons | 250/237 G |
| 4,091,280 | 5/1978 | Ellis et al. | 250/231 R |
| 4,262,198 | 4/1981 | Gupta et al. | 250/227 |
| 4,302,109 | 11/1981 | Davies | 356/375 |
| 4,517,456 | 5/1985 | Halsall et al. | 250/227 |

FOREIGN PATENT DOCUMENTS 0095273 9/1983 European Pat. Off. .

Primary Examiner—David C. Nelms
Assistant Examiner—William L. Oen
Attorney, Agent, or Firm—Kirschstein, Kirschstein, Ottinger & Israel

[57] ABSTRACT

An optical method of measuring displacement and a sensor for use in the method comprising a light guide and a concave reflective element positioned such that one end of the light guide is at the center of curvature of the reflective element. The reflective element has different regions having different reflection coefficients for light within two different wavelength bands. A member is interposed between the end and the reflective element, the member having light transmissive properties which vary spatially over the member in a direction transverse to the optical axis of the element. The member and reflective element are supported so as to allow them to be displaced relative to one another in a direction transverse to the optical axis of the element.

9 Claims, 3 Drawing Figures 4,652,747

SHAFT ENCODER HAVING A CONCAVE REFLECTIVE ELEMENT WITH TWO REGIONS OF DIFFERENT REFLECTIVITY FOR LIGHT WITHIN TWO DIFFERENT WAVELENGTH BANDS

BACKGROUND OF THE INVENTION

1. Field of the Invention

This invention relates to optical methods and sensors for measuring the displacement of an object.

2. Description of Related Art

In a known optical method of measuring the displacement of an object, a detector is arranged to measure light received by the detector from a light source, and the object is arranged such that any displacement of the object in a direction transverse to the light path between the source and detector will cause a variation in the amount of light measured by the detector so that variation in the amount of light measured by the detector is indicative of the displacement of the object.

Such a method, however, suffers the disadvantage that the amount of light measured by the detector will also vary according to the sensitivity of the detector, the light output of source, and other variations within the light path, these all being factors which may vary with time. Variations in the sensitivity of the detector, and changes in the output of the light source may be partially compensated for by the use of a reference beam. However it is difficult to compensate for variations in the light path.

SUMMARY OF THE INVENTION

1. Objects of the Invention

It is an object of the present invention to provide an optical method of measuring displacement of a body wherein this latter disadvantage may be overcome, together with a sensor for use in such a method.

2. Features of the Invention

According to the present invention an optical method of measuring displacement of an object comprises: directing light within each of at least two discrete wavelength bands onto a detector along a path including a first member having light transmissive or reflective properties which vary spatially in the same manner for light in each said wavelength band in at least one direction transverse to said path and a second member having a light transmissive or reflective properties which vary spatially in a different manner for light within each said wavelength band in at least one direction transverse to said path, said first and second members being arranged so that displacement of the object causes said first and second members to be displaced relative to one another in a direction transverse to said path; utilising the output of said detector to measure the quantity of light transmitted within each of said wavelength bands along said light path; and determining the change in the ratio of said quantities resulting from a displacement of the object.

The invention also provides a sensor for use in an optical method of measuring displacement of an object comprising: a light guide; a concave light reflective element positioned such that one end of said light guide is directed towards said reflective element from a position substantially at the centre of curvature of said reflective element; a light transmissive member interposed between said one end of said light guide and said reflective element, one of said member and said reflective element having transmissive or reflective properties as appropriate which for light within each of at least two different wavelength bands varies spatially in at least one direction transverse to the optical axis of said reflective element in a different manner for light in each said wavelength band, and the other of said member and said reflective element having light transmissive or reflective properties, as appropriate, which vary spatially in said one direction in the same manner for light in each said wavelength band, said member and said reflective element being supported so as to allow them to be displaced relative to each other in said one direction with displacement of said object.

In one particular sensor in accordance with the invention said member and reflective element are arranged for relative rotary displacement with displacement of said object.

BRIEF DESCRIPTION OF THE DRAWINGS

One method in accordance with the invention, together with a sensor for use in such a method will now be described, by way of example only, with reference to the accompanying drawings in which.

DETAILED DESCRIPTION OF THE PREFERRED EMBODIMENTS

Figure 1:
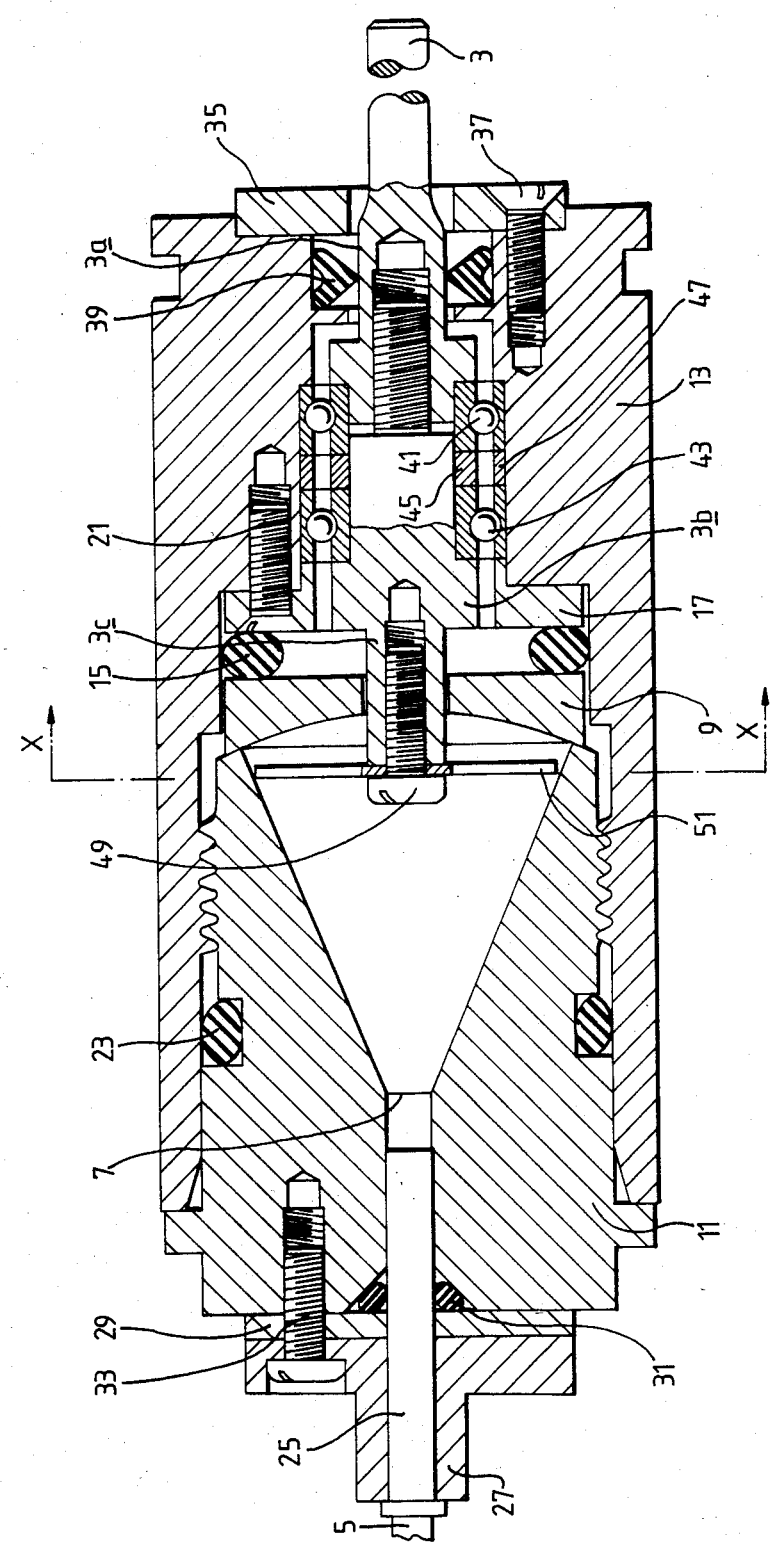
FIG. 1 shows a longitudinal section through the sensor.
Figure 3:
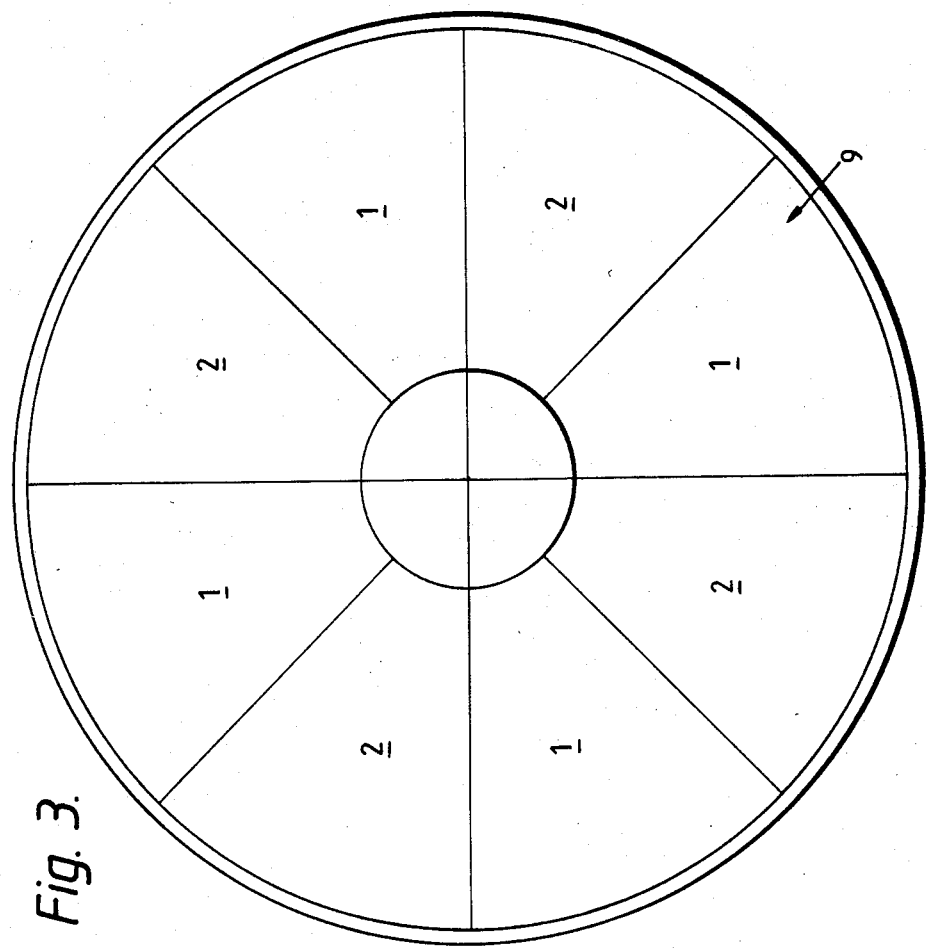
FIG. 3 is an enlarged view of one of the elements of the sensor.
Figure 2:
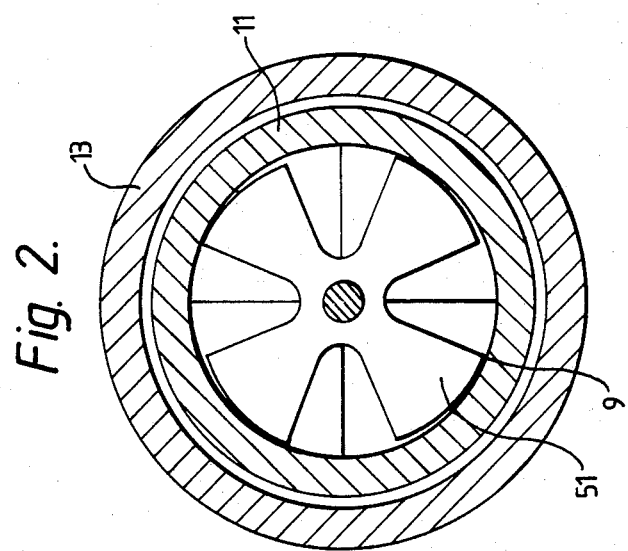
FIG. 2 shows a section on the line X—X of FIG. 1.

Referring firstly to FIG. 1, the sensor to be described in particularly adapted for measuring the angular displacement of a shaft 3 about its longitudinal axis. The sensor includes a light guide 5 in the form of a fibreoptic monofilament, one free end 7 of which lies at the centre of curvature of a plano-concave reflective element 9. Referring now also to FIGS. 2 and 3, the reflective surface of the element 9 has applied to it an alternating pattern of two different reflective coatings, the two coatings being indicated as 1 and 2 in FIG. 3. The first coating, 1, is designed to reflect more than 80% of light in the waveband 790–840 nm, and to reflect less than 1% of light in the waveband 880–930 nm. The second coating 2 is designed to reflect more than 80% of the light in the waveband 880–930 nm, and to reflect less than 1% of light in the waveband 790–840 nm.

Referring again particularly to FIG. 1, the reflective element 9 is supported by two parts 11, 13 of a housing, the plane back surface of the reflective element resting, via an 'O' ring 15, on a keep plate 17 attached by screws 21 to the part 13, the perimeter of the concave front surface of the reflective element being held by an appropriately sloping forward edge of the part 11. The part 11 is a screw fit within the part 13, and 'O' ring 23 being trapped between the two parts. The end 7 of the light guide 5 is located at the apex of a conical cavity within the part 11. The light guide extends from its end 7 in a ferrule 25 through an aperture through the part 11 and through a flange 27, the flange being secured by screws 33 onto the part 11 with an intermediate shim 29 and an 'O' ring 31.

An extension 3a of the shaft passes through an end plate 35 secured by screws 37 to the part 13, to extend into a cavity within the part 13, where it is contacted by the sealing lip of a "heart" seal 39. A further extension 3b, of the shaft enters into a further cavity with the part 13 where it is rotatably supported by bearings 41, 43 separated by inner 45 and outer 47 spacers. The shaft 3 then terminates in a nose portion 3c which passes through an aperture in the reflective element 9 into the conical cavity within the part 11. Attached to the nose portion 3c with a screw 49, such that it lies between the end 7 of the light guide 5, and the reflective element 9, is a metallic shutter 51 in the form of a Maltese Cross painted matt black as best shown in FIG. 2.

In use the light guide 5 is connected to a unit (not shown) containing electronic, electro-optic and optical components. Light within the two wavebands 790–840 nm, and 880–930 nm is shone down the light guide 5 to be reflected by the reflective element 9 and pass back up the light guide 5, the shutter 51 obscuring a portion of the reflective element 9. The quantity of light within the two different wavebands returning down the light guide 5 may then be measured. If, however, there is any angular movement of the shaft 3, the shutter 51 will rotate with respect to the reflective element 9, thus obscuring a different portion of the reflective element 9. Thus the amount of light within the two wavebands measured will change. An indication of the angular displacement of the shaft 3 may then be obtained by determining the change in the ratio of the quantities of light measured due to the displacement.

It will also be understood that if the optical transmission efficiencies for light within each of the two wavebands along the light path are calculated, and the change in the ratio of the efficiencies is determined, rather than the change in the ratio of the quantities of light measured, the method will be insensitive to differences in output of the sources and detector responses, as well as variations within the optical path with time.

It will be appreciated that whilst in the sensor described herebefore by way of example the shutter 51 moves relative to the reflective element 9, the reverse situation may be used in a sensor according to the invention, i.e. angular displacement of the shaft 3 causing movement of the reflective element 9 relative to the shutter 51. Minor modifications to the form of the sensor would then be necessary.

It will also be appreciated that other forms of the shutter 51 are possible for example a glass disc having an opaque 'arm' photographically deposited on it.

It will also be appreciated that in an alternative form of the sensor described by way of example, the reflective element 9 may be replaced by a concave reflective element which reflects light in both wavelength bands in some areas only and elsewhere is non-reflective. The shutter 51 will then be replaced by a filter element some areas of which transmit light in one wavelength band only and other areas of which transmit light in the other wavelength band only.

It will be further understood that whilst in the method and sensors described above by way of example one light reflective element and one light transmissive member i.e. a shutter are used, in alternative methods in accordance with the invention two light transmissive members in the path of light directed onto a detector may be used, one showing light transmissive properties which vary spatially in a different manner for light in each wavelength band and the other having light transmissive properties which vary spatially in the same manner for light in the two wavelength bands.

I claim:

1. An optical method of measuring displacement of an object comprising: directing light within each of at least two discrete wavelength bands onto a detector along a path including a first member having light properties which vary spatially in the same manner for light in each said wavelength band in at least one direction transverse to said path and a second member having light properties which vary spatially in a different manner for light within each said wavelength band in at least one direction transverse to said path, said first and second members being arranged so that displacement of the object causes said first and second members to be displaced relative to one another in a direction transverse to said path; utilizing the output of said detector to provide an indication of the quantity of light transmitted within each of said wavelength bands along said light path; and determining the change in the ratio of said indications resulting from a displacement of the object.

2. A sensor for use in an optical method of measuring displacement of an object comprising: a light guide; a concave light reflective element positioned such that one end of said light guide is directed towards said reflective element from a position substantially at the centre of curvature of said reflective element; a light transmissive member interposed between said one end of said light guide and said reflective element, one of said member and said reflective element having optical properties which for light within each of at least two different wavelength bands varies spatially in at least one direction transverse to the optical axis of said reflective element in a different manner for light in each said wavelength band, and the other of said member and said reflective element having optical properties which vary spatially in said one direction in the same manner for light in each said wavelength band, said member and said reflective element being supported so as to allow them to be displaced relative to each other in said one direction with displacement of said object.

3. A sensor according to claim 2 in which said reflective element is supported in a fixed position relative to said one end of said light guide, and said member is adapted for displacement with said object.

4. A sensor according to claim 2 wherein said member and reflective element are arranged for relative rotary displacement with displacement of said object.

5. A sensor according to claim 4 wherein said member is mounted for rotation on the end of a shaft extending through a central aperture in the reflective element from the side of said reflective element remote from said light guide.

6. A sensor according to claim 4 wherein said one of said member and said reflective element has two areas each of which modifies light only within a respective one of said two discrete wavelength bands and other of said member and said reflective element modifies light only in an area having a shape substantially the same as one of said two areas of said one of said member and said reflective element.

7. A sensor according to claim 4 in which said one of said member and said reflective element is said reflective element, and said member consists of an element which partially obstructs the light path between said one end of said light guide and said reflective element.

8. A sensor according to claim 7 wherein said member is a shutter comprising at least one arm of light opaque material extending radially from the part of the member lying on the optical axis of said reflective element.

9. A sensor according to claim 8 wherein said shutter has four radial arms so as to be in the form of a Maltese Cross.

* * * * *